United States Patent Office 3,298,950
Patented Jan. 17, 1967

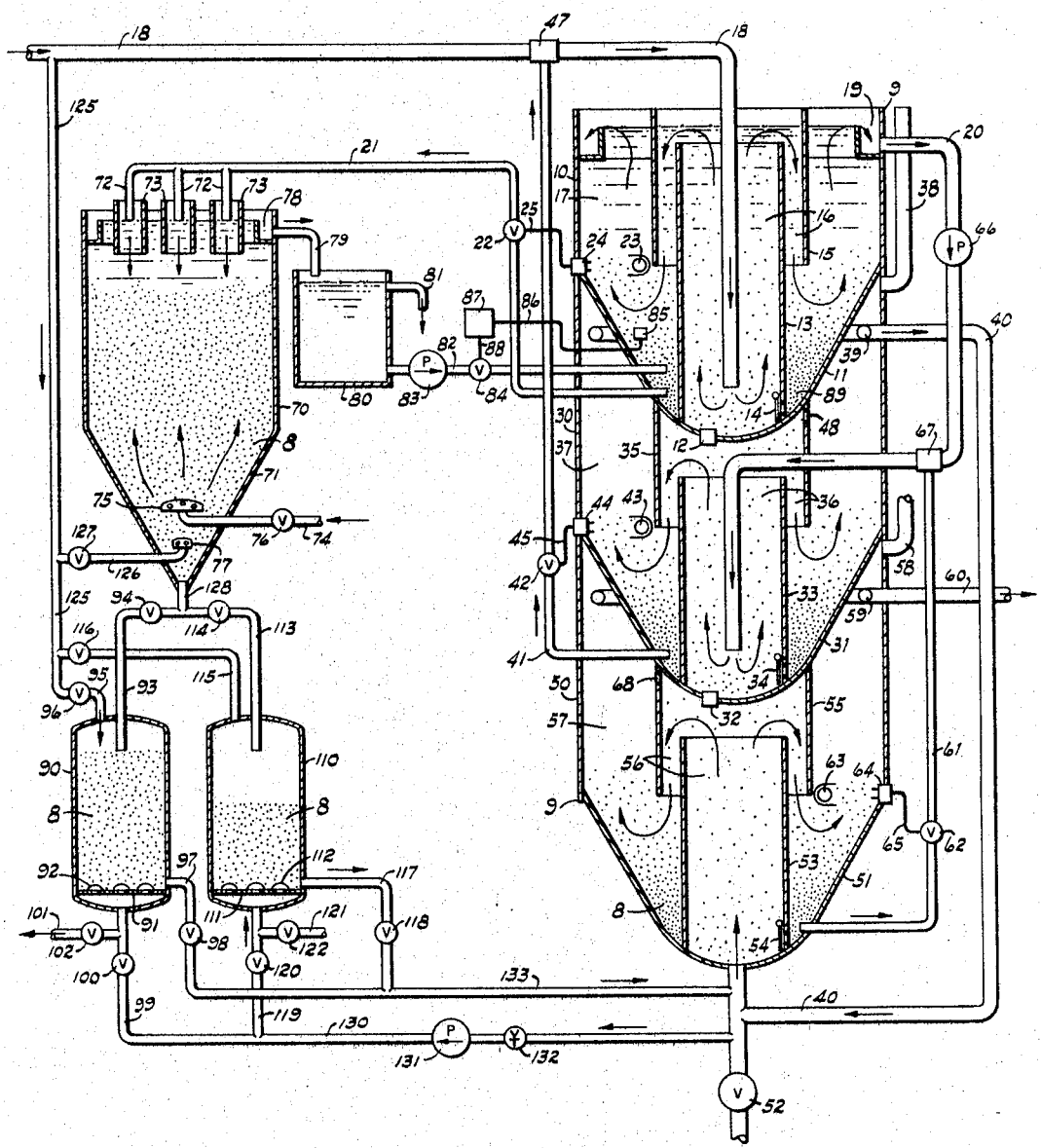

3,298,950
LIQUID TREATING APPARATUS AND METHOD
Albert B. Mindler, Princeton, N.J., assignor to Ritter
Pfaudler Corporation, a corporation of New York
Filed Apr. 13, 1964, Ser. No. 359,101
18 Claims. (Cl. 210—33)

This invention relates to liquid treating apparatus and method by solid-liquid contacting in a plurality of stages with co-current flow of liquid and solid granular treating material in the form of a slurry within each stage, the liquid passing from stage to stage in one direction and the granular treating material being transferred from stage to stage in the opposite direction, all as more fully described hereinafter and as claimed.

There are many instances in the prior art of liquid treatment by slurry contact in a single stage. However, in certain types of treatment, especially those in which mass reactions are involved, as for instance in ion exchange, such single stage treatment has been found to leave much to be desired since the effectiveness of treatment is low and the capacity of the treating material is utilized incompletely, resulting in poor efficiency and relatively high cost of treatment. I have found that these objections may be overcome by providing plural stage slurry contact treatment with liquid undergoing treatment and granular treating material passing from stage to stage in opposite directions.

It is an object of this invention to provide a novel apparatus and method for effective, efficient and economical liquid treatment by solid-liquid contacting in a plurality of stages which treatment may be carried out continuously, i.e. without interrupting operation for purposes of reconditioning or regeneration.

Other objects, novel features and advantages will appear from the following description.

The manner in which these objects are achieved is illustrated in the accompanying drawing which shows, in more or less diagrammatical form and partly in cross-section, an apparatus in accordance with my invention and suitable for carrying out my novel method of liquid treatment.

For purposes of illustration, but not limitation, there is shown in the drawing an apparatus particularly adapted for softening treatment of water by contact with granular cation exchange resin 8. The apparatus has a cylinder 9 in which are, in this case, three treatment stages in series, a first stage 10, a second stage 30 and a third stage 50.

The first stage 10 has a bottom 11 in the form of an inverted cone with its apex rounded off, provided at or near its lowest point with a so-called mud valve 12 which has an operating stem (not shown) extending to the outside of the stage 10. Mounted on the bottom 11 and extending part way up in stage 10 is an inner cylinder 13 provided near its lower end with a flap valve 14 which is hinged at its top on the inside of cylinder 13 so that it is normally closed, but capable of opening automatically when the pressure on the outside of cylinder 13 is higher than the pressure on the inside of cylinder 13. An outer cylinder 15 extends from the top of stage 10 part way down. The stage 10 is thus divided into a mixing zone 16 consisting of the spaces on the inside of the cylinders 13 and 15, and a separating zone 17 consisting of the space outside of cylinder 15 and, below cylinder 15, the space outside of cylinder 13. The mixing zone 16 and the separating zone 17 are in communication with each other through the open lower end of cylinder 15. An inlet pipe 18 extends downwardly to the lower portion of the mixing zone 16 inside the inner cylinder 13. An outlet flume 19 near the top of the separating zone 17 is in communication with an outlet pipe 20 for partially treated water. An outlet pipe 21 for resin 8, provided with a valve 22, terminates in the lower portion of the separating zone 17. A light source 23 is provided to throw a horizontal beam of light along an intermediate level of the separating zone 17 onto a photo-electric cell 24 which has an operating connection 25 with the valve 22, whereby the photo-electric cell 24 is adapted to open valve 22 automatically when there is a substantial quantity of resin particles in the beam of light, and to close valve 22 when there is no substantial quantity of resin particles in the beam of light projected by the light source 23 towards the photo-electric cell 24.

Aside, essentially, from the fact that the first stage 10 has an open top whereas the second stage 30 and the third stage 50 have each a top which is closed by the bottom of the preceding stage, the three stages are quite similar. Thus, stage 30 has a bottom 31 with a mud valve 32. An inner cylinder 33, fitted with a flap valve 34 near its lower end and an outer cylinder 35 with a vent hole 48 near its top divide the stage 30 into a mixing zone 36 and a separating zone 37. The pipe 20 extends to the lower portion of the mixing zone 36. A vent 38 is provided to release air from the top of the separating zone 37. A perforated collector ring 39 near the top of the separating zone 37 is connected with an outlet pipe 40. A resin transfer pipe 41 fitted with a valve 42 leads from the lower portion of the separating zone 37. A light source 43 is provided to throw a beam of light along an intermediate level of the separating zone 37 onto a photo-electric cell 44 which has an operating connection 45 with the valve 42. The transfer pipe 41 is connected with the suction inlet of an ejector 47 in inlet pipe 18.

The third stage 50 has a bottom 51. An inner cylinder 53 with a flap valve 54 and an outer cylinder 55 with a vent hole 68 divide the stage 50 into a mixing zone 56 and a separating zone 57. The pipe 40 extends to the lower portion of the mixing zone 56 and is provided with a drain valve 52. A vent 58 (which is shown broken off but which actually extends to the top of the apparatus) is connected with the top portion of the separating zone 57 in which is located a perforated collector ring 59 connected with an outlet pipe 60 for treated water. A resin transfer pipe 61 provided with a valve 62 leads from the lower portion of the separating zone 57. A light source 63 is provided to throw a horizontal beam of light along an intermediate level of the separating zone 57 onto a photo-electric cell 64 which has an operating connection 65 with the valve 62. In the pipe 20 are a booster pump 66 and, on the downstream side of pump 66, an injector 67. The transfer pipe 61 is connected with the suction inlet of ejector 67.

To recondition the cation exchange resin 8 there are provided a regenerating tank 70 with a conical bottom 71, and two rinse or measuring tanks 90 and 110. Such measuring tanks are disclosed in the co-pending application of A. W. Kingsbury, Serial No. 186,711, filed Apr. 11, 1962, now Patent 3,208,934, dated Sept. 28, 1965. The outlet pipe 21 has several branches 72 which are so disposed as to discharge through anti-splash sleeves 73 into the top of the regenerating tank 70 which is located below the flume 19. A brine inlet pipe 74 provided with a valve 76 leads from a brine supply (not shown) to the lower portion of the regenerating tank 70 where it terminates in a brine distributor 75. Within tank 70, but below the brine distributor 75, is a water distributor 77. At the top of the regenerating tank 70 is a flume 78 for collecting spent brine and discharging it through an outlet pipe 79 into a storage tank 80 provided with a waste overflow pipe 81. A transfer pipe 82 fitted with a pump 83 and a valve 84 leads from the storage tank 80 to the lower portion of the separating zone 17. In the lower portion of the separating zone 17 but above the end of outlet pipe 21 are electrodes 85 having a connection 86 with an electric conductivity meter 87 with an operating connection 88 to the valve 84 whereby the meter 87 is adapted to open valve 84 when the electric conductivity of the liquid at electrodes 85 is below a predetermined value and to close valve 84 when it is above such predetermined value. Both the electric conductivity and the specific gravity of spent brine are substantially higher than those of water. Therefore, spent brine admitted through transfer pipe 82 collects in the lower portion of separating zone 17 as a pool 89. When the top of the pool 89 is below electrodes 85 valve 84 is open. As soon as the top of the pool 89 has risen to the electrodes 85 the higher conductivity of the spent brine causes valve 84 to close. Thus the top level of the pool 89 of spent brine is maintained at or near the level at which the electrodes 85 are located. This level, as shown, is low enough so that there is no danger that the water being treated will pick up and thus become contaminated with brine from the pool 89.

The rinse tanks 90 and 110 are located below the regenerating tank 70 and are similar, each having, respectively, a false bottom 91, 111 with strainers 92, 112, a resin inlet pipe 93, 113 with a valve 94, 114, a rinse inlet pipe 95, 115 with a valve 96, 116, a resin outlet pipe 97, 117 with a valve 98, 118, a displacement water inlet pipe 99, 119 with a valve 100, 120, and a rinse water outlet pipe 101, 121 with a valve 102, 122. A pipe 125 connected with the water inlet pipe 18 leads to the rinse inlet pipes 95 and 115, and also has a branch 126 provided with a valve 127 and leading to the water distributor 77. A resin outlet pipe 128 leads from the bottom 71 of regenerating tank 70 to the resin inlet pipes 93 and 113. A displacement water supply pipe 130 provided with a booster pump 131 and a throttling valve 132 leads from the pipe 40 to the inlet pipes 99 and 119, and a resin supply pipe 133 leads from the resin outlet pipes 97 and 117 back to the pipe 40, thus placing pipe 133 in communication with the lower portion of the mixing zone 56.

In operation of the apparatus, as shown in the drawing, the pumps 66, 83 and 131 are running. Valves 76, 96, 102, 118 and 120 are open, valves 94, 98, 100, 114, 116, 122 and 127 are closed, and throttling valve 132 is partly open. Valves 22, 42, 62 and 84 operate automatically, alternately opening and closing under control, respectively, by the photo-electric cells 24, 44, and 64, and the electric conductivity meter 87.

Raw water enters through pipe 18 and in injector 47 picks up resin 8 drawn in through transfer pipe 41 as a slurry from the separating zone 37 of the second stage 30. The mixture of raw water and resin is discharged from pipe 18 into the lower part of the mixing zone 16 of the first stage 10 through which it flows as a dispersed slurry into the separating zone 17, thereby becoming partly softened. In the separating zone 17, because of the change in direction and the lower velocity due to the upwardly increasing horizontal cross-sectional area the dispersed slurry is separated. The resin 8 settles into a relatively dense slurry in the lower portion of the separating zone 17 whereas the partly treated water rises through the upper portion and flows into flume 19 and thence into pipe 20 in which its pressure is boosted by the pump 66. The water then passes through ejector 67, picking up resin 8 drawn in as a slurry through the transfer pipe 61 from the separating zone 57 of the third stage 50. The mixture of water and resin is discharged from pipe 20 into the lower part of the mixing zone 36 of the second stage 30 through which it flows as a dispersed slurry into the separating zone 37, thereby becoming further softened. In the separating zone 37, again because of the change in direction and the lower velocity due to the upwardly increasing horizontal cross-sectional area, the resin 8 settles into a relatively dense slurry in the lower portion of the separating zone 37 whereas the further softened water rises through the upper portion and flows through the collector ring 39 into pipe 40. The rinse tank 110 holds a quantity of fresh resin 8 which has been reconditioned by regenerating and rinsing. The pump 131 causes a flow of partly softened water from pipe 40 through pipes 130 and 119 into tank 110 and up through the strainers 112, forcing a slurry of the fresh resin 8 through pipes 117 and 133 into pipe 40 where it mixes with the partly softened water. This mixture then flows as a dispersed slurry through the mixing zone 56 of the third stage 50 into the separating zone 57 whereby the water undergoes a further softening treatment. In the separating zone 57 the resin 8 settles out into the lower portion as a dense slurry, while the treated water rises through the upper portion and flows through the collector ring 59 and pipe 60 to a point of further treatment or use.

From the lower portion of the separating zone 17 in the first stage 10 the resin 8 flows as a slurry by gravity through outlet pipe 21 and branches 72 into the top of the regenerating tank 70. Brine enters through pipe 74 and the distributor 75 to flow upwardly through the bed of resin 8 in tank 70, regenerating the resin. The spent brine flows through flume 78 and pipe 79 into the storage tank 80 which overflows to waste through pipe 81. A portion of the spent brine in tank 80 is forced by the pump 83 into the lower portion of the separating zone 17 to maintain the pool 89 of spent brine which is used to form the slurry flowing through outlet pipe 21.

Raw water from pipe 18 flows via pipes 125 and 95 into the top of tank 90 and downwardly through the bed of freshly regenerated resin 8 therein, rinsing it free of spent and excess brine. The rinse water then flows through strainers 92 and pipe 101 to waste. When the rinsing has been completed valves 96 and 102 are closed.

When the resin 8 in tank 110 has been used up valves 118 and 120 are closed and valves 98 and 100 are opened. This transfers the supplying of resin 8 from tank 110 to tank 90, the flow being from pipe 40 through pipes 130 and 99 into tank 90 and up through the strainers 92. This forces a slurry of resin 8 through pipes 97 and 133 back into pipe 40.

Tank 110 is now refilled with regenerated resin 8 by opening valves 114, 122 and 127. Water entering from pipe 18 through pipes 125 and 126 and distributor 77 causes a slurry of regenerated resin 8 to flow from the lower portion of the regenerating tank 70 through pipes 128 and 113 into tank 110. As regenerated resin is thus withdrawn from the lower portion of tank 70 while exhausted resin is introduced to its top, the resin 8 in tank 70 moves downwardly, in counter-current to the upward flow of regenerating solution. The resin 8 collects on the underdrain 111 in the form of a bed while the water flows to waste via strainers 112 and pipe 121. When the top of the bed of resin 8 in tank 110 has reached the lower end of pipe 113 the flow of resin stops automatically. Now valves 114 and 127 are closed and valve 116 is opened so that the resin 8 in tank 110 is rinsed free of spent and excess brine by a flow of water from pipe 18 through pipes 125 and 115, downwardly through the bed of resin 8 in tank 110, and thence to waste via strainers 112 and pipe 121.

When the resin 8 in tank 110 has been completely rinsed and the resin 8 in tank 90 has been used up the supplying of resin 8 to the mixing zone 56 is once more switched back to tank 110 by closing valves 98 and 100 and opening valves 118 and 120. Now tank 90 is first refilled with resin 8 from the regenerating tank 70 by opening valves 94, 102 and 127, and the resin 8 in tank 90 is then rinsed, as described above.

Any air collecting within cylinder 35 passes through the vent hole 48 into the separating zone 37 from which in turn air is released to the atmosphere through vent 38. The tops of mixing zone 56 and separating zone 57 are similarly vented through vent hole 68 and vent 58.

The primary control for the resin transfer is by adjustment of the throttling valve 132 which is so set that the rate at which resin 8 is supplied to mixing zone 56 provides the softening capacity required by the rate of flow and hardness of the water admitted to the mixing zone 16. The photoelectric cells 24, 44 and 64 then govern the orderly transfer of resin from stage to stage and into the regenerating tank 70 as described above, without permitting an excessive quantity of resin 8 to accumulate in any one stage.

In each stage there is co-current flow of resin and water through the mixing zone and into the separating zone, but resin and water pass from stage to stage in opposite directions which makes for effective and efficient performance. The softening operation may continue indefinitely without interruption except for maintenance. If the apparatus is to be emptied for purposes of inspection, cleaning or repair this is accomplished by stopping the flow of water through pipe 18 (as by closing a valve, not shown) and opening the mud valves 12 and 32 and the drain valve 52. All three stages 10, 30 and 50 will then empty, the water and resin in the lower portions of the separating zones 17, 37 and 57 escaping through the automatically opening flap valves 14, 34 and 54, respectively.

The use of spent brine for transferring resin 8 from the first stage 10 to the regenerating tank 70 in accordance with one feature of my invention has two principal advantages. First, if water were used for this purpose this would be partly softened water so that there would be a waste of not only water but also softening capacity. Second, since the resin being so transferred is the most exhausted resin its contact with even spent brine produces a slight regenerating effect so that the resin arrives in the regenerating tank 70 with a small portion of its capacity already restored.

For best overall results I prefer to use resin of a grain size substantially between 40 and 70 or even 100 mesh screens, which is considerably finer than the grain size used in conventional bed treatment. However, the grain size is not critical. Basically, the coarser the grains, the higher the velocity may be without danger of carrying grains out in the treated water, but the lower will be the effectiveness of treatment in each stage. A coarser resin also requires a higher upward velocity in the mixing zones to keep the grains suspended and moving.

In the drawing the several stages are arranged one above the other. This makes for a design which is both compact and economical because the bottom of one stage forms the top of the stage below it. However, other arrangements may, of course, be used. Furthermore, in lieu of employing three stages, as shown, it is possible to use only two stages when less complete treatment is acceptable, or more than three stages when more complete treatment is desired.

One series of stages may be served by more than one regenerating tank and by more than two rinse tanks. Thus, since rinsing usually takes considerably longer than the other operations carried out in the rinse tank, as described above, a good arrangement is one with six rinse tanks, one being refilled with resin, three being rinsed, one on stand-by upon completion of rinsing, and one being used to supply resin to the mixing zone of the last stage. The valves associated with the regenerating and rinse tanks which require periodic opening and closing may, of course, be automated by employing known operating and timing devices.

As a rule, dilute brine is preferred to concentrated brine for regenerating cation exchange material. Therefore, if the brine supplied through pipe 74 is concentrated valve 127 may be left open at all times, adjusted so that the water admitted through distributor 77 upon mixing with the concentrated brine admitted through the distributor 75 will produce the desired dilution.

The withdrawal of resin from a single point in each separating zone, as shown, will result in the dense slurry being deeper opposite the point of withdrawal. Such unevenness may be substantially reduced by providing the outlet pipe 21 as well as the transfer pipes 41 and 61 each with several branches which terminate at the same level but at points spaced horizontally from each other in the lower portions of the separating zones 17, 37 and 57, respectively.

The apparatus shown and described herein may be used alternatively for anion exchange treatment by merely substituting anion exchange resin for the cation exchange resin 8, and the solution of a suitable alkali for brine. However, my invention may also be employed, if indicated, with appropriately modified reconditioning means, for treatment of liquids other than water, as for instance sewage, and by contact with granular treating materials other than ion exchangers, such as activated carbon, molecular sieves and other granular materials.

While I have shown and described what I consider the best way of carrying out my invention modifications other than those specifically referred to herein may be made without departing from its spirit, and reference is, therefore, made to the following claims for a definition of the scope of my invention.

What I claim is:

1. A liquid treating apparatus comprising a plurality of similar treatment stages arranged in a series, each of said stages comprising a mixing zone, a separating zone and means providing communication between said mixing zone and the lower portion of said separating zone, an inlet pipe for liquid to be treated connected with the mixing zone of the first stage in said series, pipe means interconnecting the upper portion of the separating zone of each except the late stage in said series and the mixing zone of the next succeeding stage in said series, an outlet for treated liquid connected with the upper portion of the separating zone of the last stage in said series, supply means for feeding granular treating material to the mixing zone of the last stage in said series, each stage except the first stage in said series having transfer means connected with the lowest portion of its separating zone and being connected and adapted for moving granular treating material to the mixing zone of the next preceding stage in said series, and means connected with the lowest portion of the separating zone of the first stage in said series for withdrawing granular treating material.

2. The apparatus of claim 1, the stages in said series being located at different elevations, the first stage being uppermost and the last stage being lowermost.

3. The apparatus of claim 1, said transfer means of the second stage in said series being an injector in said inlet pipe, said injector having a suction inlet pipe terminating in the separating zone of the second stage in said series.

4. The apparatus of claim 1, said transfer means of the third stage in said series comprising a booster pump and an injector in the said pipe means interconnecting the upper portion of the separating zone of the first stage in said series and the mixing zone of the second stage in said series, said injector being on the downstream side of said booster pump and having a suction inlet pipe terminating in the separating zone of the third stage in said series.

5. In the apparatus of claim 1, a tank containing a supply of granular treating material, said supply means comprising a branch pipe leading to said tank from the said pipe means interconnecting the upper portion of the separating zone of the next to the last stage in said series and the mixing zone of the last stage in said series, a booster pump in said branch pipe, and a pipe connected with said tank and in communication with the mixing zone of the last stage in said series.

6. In the apparatus of claim 5, a throttling valve in said branch pipe.

7. A liquid treating apparatus comprising a plurality of similar treatment stages arranged in a series, each of said stages comprising a mixing zone, a separating zone and wall means separating said mixing zone from the upper portion of said separating zone but providing communication between said mixing zone and the lower portion of said separating zone, an inlet pipe for liquid to be treated connected with the mixing zone of the first stage in said series, pipe means interconnecting the upper portion of the separating zone of each except the last stage in said series and the mixing zone of the next succeeding stage in said series, an outlet for treated liquid connected with the upper portion of the separating zone of the last stage in said series, supply means for feeding granular treating material to the mixing zone of the last stage in said series, each stage except the first stage in said series having a transfer pipe connected with the lowest portion of its separating zone and transfer means connected with said transfer pipe and being connected and adapted for moving granular treating material to the mixing zone of the next preceding stage in said series, and an outlet pipe connected with the lowest portion of the separating zone of the first stage in said series for withdrawing granular treating material.

8. In the apparatus of claim 7, a valve in said outlet pipe and in each of said transfer pipes, each stage having a light source throwing a horizontal beam of light along an intermediate level of its separating zone and a photoelectric cell located in and responsive to said beam of light, in the first stage the photo-electric cell being connected and adapted to control the said valve in said outlet pipe, and in each stage except the first stage the photo-electric cell being connected and adapted to control the said valve in the transfer pipe.

9. In the apparatus of claim 7, said granular treating material being ion exchange resin, a regenerating tank, said outlet pipe being arranged to discharge into said regenerating tank, a fresh regenerant solution inlet and a spent regenerant solution outlet connected with said regenerating tank, a regenerant transfer pipe in communication with said spent regenerant solution outlet and connected with the lower portion of the separating zone of the first stage in said series, and a valve and a pump in said regenerant transfer pipe.

10. In the apparatus of claim 9, a storage tank connected with said spent regenerant solution outlet and with said regenerant transfer pipe, and an overflow pipe connected with the upper portion of said storage tank.

11. In the apparatus of claim 9, an electric conductivity meter having a pair of electrodes located in the lower portion of the separating zone of the first stage in said series and above the end of said outlet pipe, said meter being connected and adapted to control said valve in said regenerant transfer pipe.

12. In the apparatus of claim 9, a plurality of rinse tanks, a resin slurry transfer pipe connected with the lower portion of said regenerating tank and having a plurality of valved branches each connected with one of said rinse tanks, a valved rinse water inlet and a valved rinse water outlet for each of said rinse tanks, said supply means comprising a pipe communicating with the mixing zone of the last stage in said series and having a plurality of valved branches each connected with one of said rinse tanks, and another pipe which is connected with the said pipe means interconnecting the upper portion of the separating zone of the next to the last stage in said series and the mixing zone of the last stage in said series, said other pipe having a plurality of valved branches each connected with one of said rinse tanks.

13. In the apparatus of claim 12, a booster pump and a throttle valve in said other pipe.

14. A method of treating liquid by contact with granular treating material which comprises maintaining a series of treatment stages, maintaining in each of said stages a mixing zone and a separating zone, establishing in each of said stages flow of a slurry consisting of liquid being treated and granular treating material through said mixing zone and from said mixing zone to said separating zone, supplying liquid to be treated to the mixing zone of the first stage in said series, flowing liquid from the upper portion of the separating zone of each except the last stage to the mixing zone of the next succeeding stage in said series, and from the upper portion of the separating zone of the last stage in said series to a point of disposal, supplying fresh granular treating material to the mixing zone of the last stage in said series, transferring granular treating material from the lower portion of the separating zone of each except the first stage to the mixing zone of the next preceding stage in said series, and removing granular treating material from the lower portion of the separating zone of the first stage in said series.

15. In the method of claim 14, reconditioning the granular treating material removed from the separating zone of the first stage in said series and then employing said reconditioned granular treating material as fresh granular treating material supplied to the mixing zone of the last stage in said series.

16. In the method of claim 15, maintaining in the lowest portion of the separating zone of the first stage in said series a pool of spent reconditioning liquid having a specific gravity higher than that of the liquid being treated, employing spent reconditioning liquid from said pool in said removal of granular treating material from the separating zone of the first stage in said series in the form of a slurry, and replenishing said pool with spent reconditioning liquid.

17. A method of treating liquid by contact with granular ion exchange material which comprises maintaining a series of treatment stages, a regeneration zone and a plurality of rinse zones, maintaining in each of said treatment stages a mixing zone and a separating zone, establishing in each of said stages flow of a dispersed slurry consisting of liquid being treated and granular ion exchange material through said mixing zone and from said mixing zone to said separating zone, supplying liquid to be treated to the mixing zone of the first stage in said series, flowing liquid from the upper portion of the separating zone of each except the last stage to the mixing zone of the next succeeding stage in said series, and from the upper portion of the separating zone of the last stage in said series to a point of disposal, periodically transferring regenerated ion exchange material from said regeneration zone to each of said rinse zones, rinsing ion exchange material in one of said rinse zones and simultaneously transferring ion exchange material from another of said rinse zones to the mixing zone of the last stage in said series, transferring ion exchange material from the lower portion of the separating zone of each except the first stage to the mixing zone of the next preceding stage in said series, transferring ion exchange material from the lower portion of the separating zone of the first stage in said series to said regeneration zone, and regenerating ion exchange material in said regeneration zone by admitting fresh regenerant solution to and withdrawing spent regenerant solution from said regeneration zone.

18. In the method of claim 17, maintaining a pool of spent regenerant solution in the lower portion of the separating zone of the first stage in said series, employing spent regenerant solution from said pool in said last named transfer, and replenishing said pool with a portion of the spent regenerant solution withdrawn from said regeneration zone.

References Cited by the Examiner
UNITED STATES PATENTS

| | | | |
|---|---|---|---|
| 2,263,398 | 11/1961 | Robinson | 210—259 |
| 3,152,072 | 10/1964 | Yomiyama et al. | 210—33 |
| 3,215,624 | 11/1965 | Frazer et al. | 210—33 |

MORRIS O. WOLK, Primary Examiner.

E. G. WHITBY, Assistant Examiner.

UNITED STATES PATENT OFFICE
CERTIFICATE OF CORRECTION

Patent No. 3,298,950

January 17, 1967

Albert B. Mindler

It is hereby certified that error appears in the above numbered patent requiring correction and that the said Letters Patent should read as corrected below.

Column 6, line 35, for "late" read -- last --.

Signed and sealed this 24th day of October 1967.

(SEAL)
Attest:

Edward M. Fletcher, Jr.
Attesting Officer

EDWARD J. BRENNER
Commissioner of Patents